Sept. 15, 1942.　　　　H. D. BREEN　　　　2,295,711
LATCH MECHANISM
Filed Oct. 5, 1939　　　　2 Sheets-Sheet 2
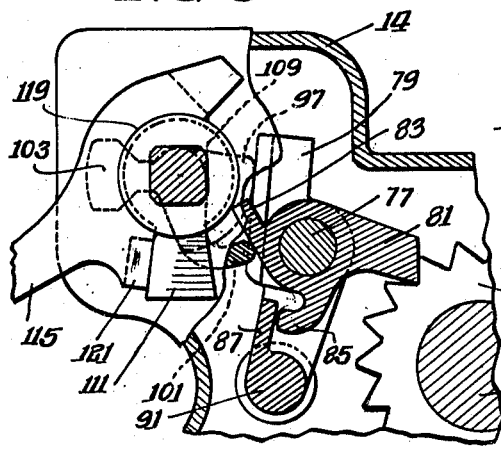
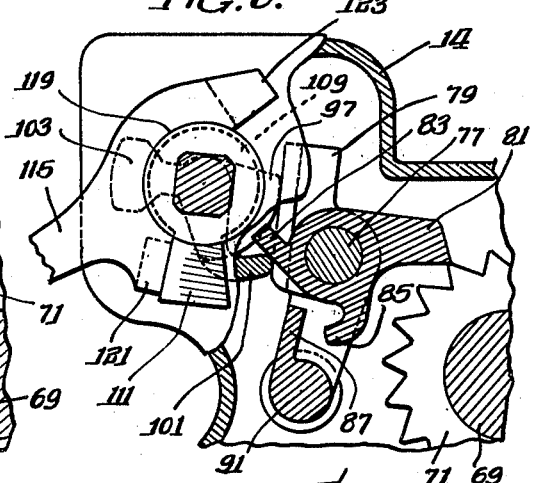
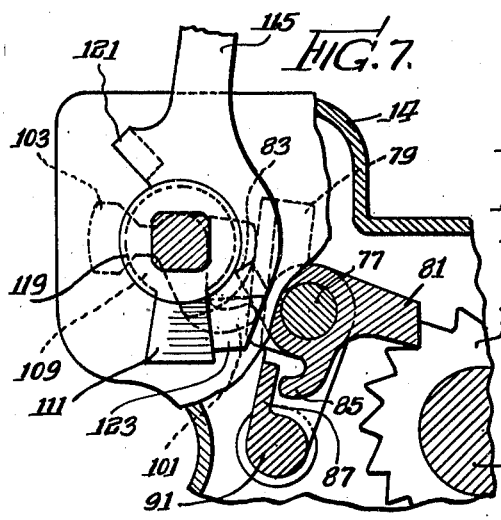
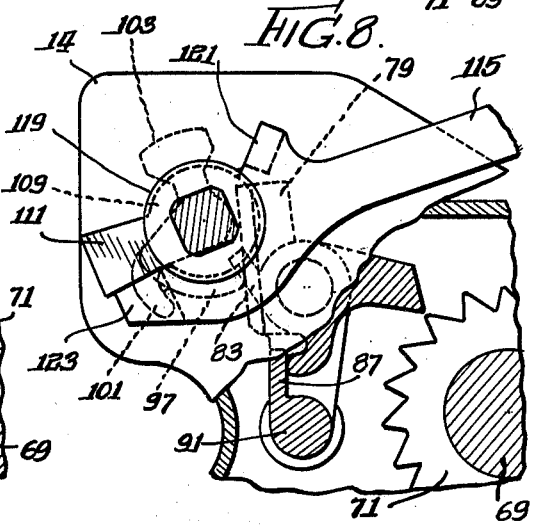
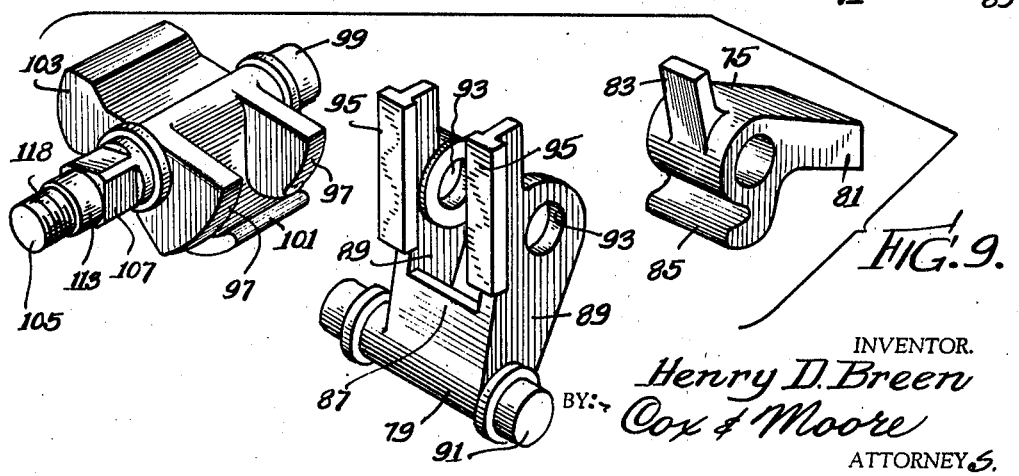
INVENTOR.
Henry D. Breen
BY: Cox & Moore
ATTORNEYS.

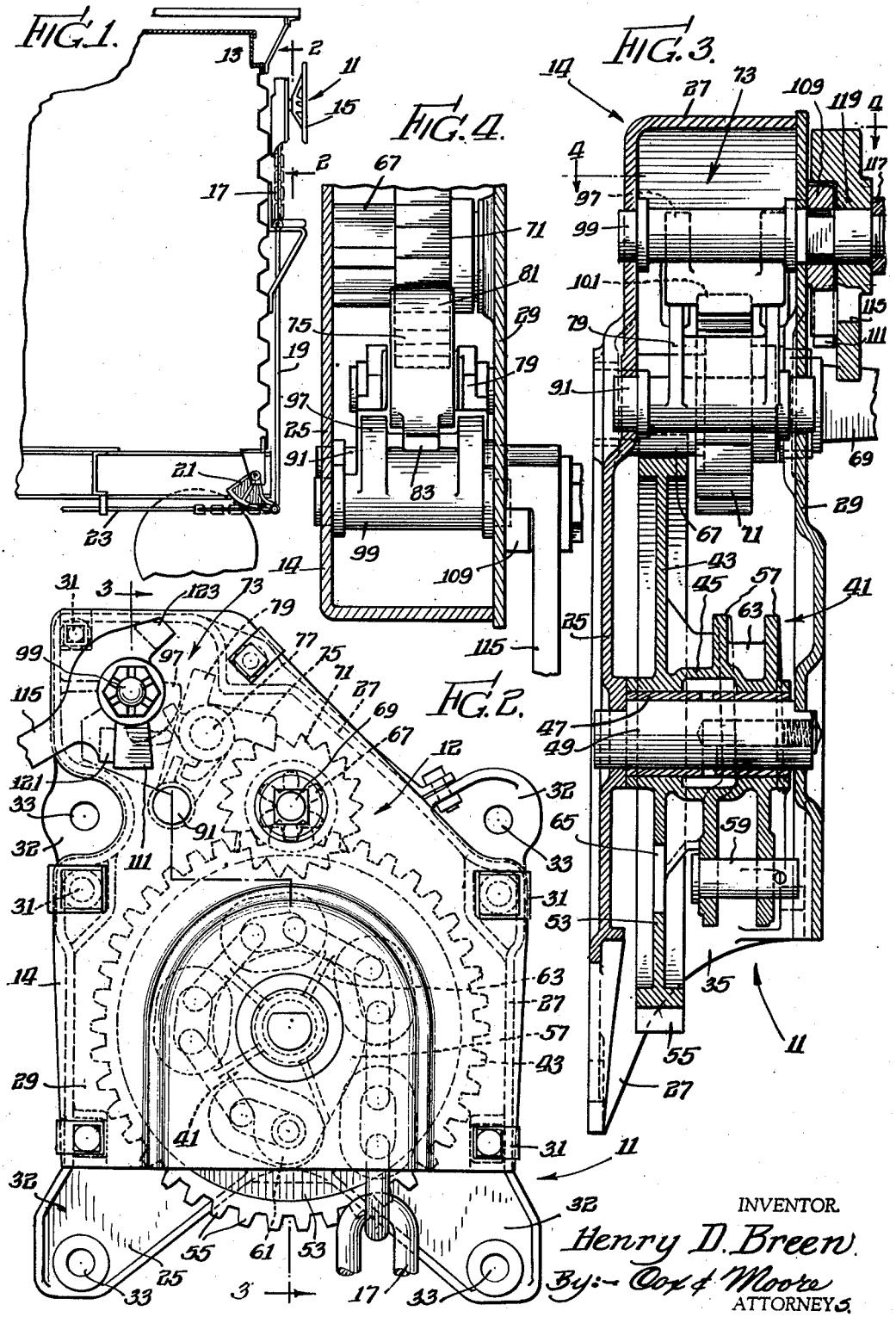

Patented Sept. 15, 1942

2,295,711

UNITED STATES PATENT OFFICE 2,295,711

LATCH MECHANISM

Henry D. Breen, Chicago, Ill., assignor to Union Asbestos & Rubber Company, Chicago, Ill., a corporation of Illinois Application October 5, 1939, Serial No. 298,083

10 Claims. (Cl. 74—505)

My invention relates in general to tensioning mechanism, and has more particular reference to tensioning means for vehicle brakes, especially railroad car brakes.

An important object of the present invention is to provide improved manually-operable tensioning means for brake mechanism of the type in which a winding drum and associated holding pawl may be operated to wind a flexible tensioning member on the drum and retain the same in tensioned condition, the mechanism being operable to cause the pawl to release the drum for unwinding movement of the flexible member thereon.

A further object of the invention is to provide improved mechanism whereby the apparatus may be conditioned so that the drum may be released by the pawl merely by manipulating the manually-operable drum tensioning member.

Another important object is to provide a manually-operable pawl control adapted to be arranged in a position normally holding the pawl in engagement with a cooperating ratchet-wheel, and in another position in which the pawl is held in position engaging the ratchet-wheel only so long as the ratchet-wheel maintains a thrust against the pawl; a further object being to provide a composite pawl comprising a shiftable pawl carrier and a pawl piece shiftable on the carrier in combination with a pawl-controlling member cooperatively associated with both the carrier and the pawl piece and shiftable to selectively engage and release the carrier and the pawl piece in order to control the same in the manner heretofore mentioned.

Another important object is to provide a composite pawl comprising a tiltable pawl carrier having a pawl mounted thereon for rocking movement between positions engaging and releasing a cooperating ratchet-wheel, including adjustable control means operatively associated with said carrier and the pawl to hold the carrier in one position with the pawl in operative relationship with the ratchet, and to yieldingly urge the pawl into engagement with the ratchet to prevent ratchet rotation in one direction, said control means yielding to permit the pawl to release the ratchet for rotation only in the other direction, said control means being shiftable to an intermediate position holding the carrier in position maintaining the operative relationship of the pawl and ratchet, from which intermediate position the control will drop, without manipulation, to a releasing position upon turning the ratchet in a direction to release the thrust thereof upon the pawl, said control means in released position permitting movement of said carrier in a direction to retract the pawl from the ratchet.

Another important object is to provide cooperating stops on the pawl and the carrier to limit the turning movement of the pawl toward the ratchet when the control is in the released position.

Another important object is to utilize a pawl control having a cam coacting with the pawl carrier to control the same; a further object being to provide, on said control means and on said pawl, cooperating abutments in predetermined relationship with respect to the cam for the control of the pawl on the carrier.

Another important object is to utilize a pawl control comprising rotatable means for engaging and controlling the pawl and its carrier, and a weighted handle for controlling the movement of the rotatable control means; a further object being to provide for lost motion between the rotatable control means and said handle; a still further object being to provide for lost motion by means of interengaging abutments on the handle and on the rotatable pawl and carrier engaging element.

A further object is to provide a simplified, automatic pawl control mechanism particularly adapted for use in the winding mechanism of brake-tensioning means such as are used in vehicles and particularly railroad vehicles whereby to allow the control handle to be moved to the on position, preventing unwinding movement of the winding mechanism, while allowing tensioning movement thereof, and to allow the control handle to be set in an intermediate position holding the winding mechanism in tensioned condition, the handle in its intermediate set position being arranged to move automatically and without human attention to a releasing position as a result of slight additional tensioning on the winding mechanism, so that the brakemen need only tighten the mechanism slightly, with the handle in its intermediate set position, in order to release the brake-holding pawl.

These and numerous other important objects, advantages and inherent functions of the invention will become apparent as the same is more fully understood from the following description which, taken in connection with the accompanying drawings, discloses a preferred form of the invention.

Referring to the drawings,

Figure 1 is a fragmentary view of the end of a railroad freight car having brake-tensioning means embodying my present invention;

Figure 2 is a sectional view taken substantially along the line 2—2 in Figure 1;

Figure 3 is a sectional view taken substantially along the line 3—3 in Figure 2;

Figure 4 is a sectional view taken substantially along the line 4—4 in Figure 3;

Figures 5, 6, 7 and 8 are enlarged fragmentary views of a portion of the device as shown in Figure 2, illustrating the several positions of the parts in operation; and Figure 9 is an exploded view showing certain of the operating parts in perspective.

To illustrate my invention, I have shown on the drawings a brake-operating mechanism 11 adapted for assembly as a unit in brake-operating position, as on a railroad car 13. The brake-operating mechanism comprises cooperating elements forming a winding mechanism 12 supported on a mounting which may and preferably does comprise a housing 14 for enclosing the winding mechanism and protecting the same from the weather, as well as a frame of sufficient strength to carry the elements of the mechanism and sustain the stresses imparted thereto as a result of its operation. The winding mechanism is adapted to be manually operated, as by means of a hand wheel 15, in order to tension a flexible element, such as a chain 17, which is connected to the brake rigging of the car in any suitable fashion.

In the illustrated embodiment the chain is attached to a draw-rod 19 which in turn is connected to one arm of a tiltable bell crank 21 carried on the car 13 and connected to transfer the movement of the pull-rod 19 to a rod 23 which is connected for operating the brake mechanism. Obviously, any preferred or equivalent means may be utilized for transferring the drawing effect of the flexible tensioning element 17 to the brake rigging, although it is preferable to utilize transfer means adapted to multiply the brake applying force of the element 17.

The housing 14 may be of any suitable construction and is formed for attachment on the wall of the car 13. The casing preferably comprises a metal plate 25 forming the back wall of the housing and having preferably integrally-formed marginal flanges 27 along its sides and top, providing side and top walls of the housing, and a removable cover 29 secured on the edges of the flange portions 27, as by the fastening means 31, to form a front wall for the housing 14.

The back plate 25 also may have integrally-formed portions 32 provided with perforations 33 for the reception of bolts, rivets or other fastening means for the attachment of the device in mounted position on the vehicle 13. The casing portions may be formed as metal castings or as drawn sheet-metal elements, in fact, the present invention is not necessarily restricted to the form, construction or arrangement of the parts forming the casing. The casing, however, defines an opening 35 at its bottom end, through which the tension element 17 extends, the same being connected with the winding mechanism 12 which is mounted within the housing and between the front and back walls 25 and 29.

In the illustrated embodiment the winding mechanism comprises a winding drum 41 and a drum-driving gear 43, preferably formed as an element integral with the drum and comprising a hub 45 carrying the drum 41 and gear 43, and adapted to receive a bushing 47 whereby to rotatably mount the element on a shaft or pin 49. The opposed ends of the shaft are secured, respectively, in the back plate 25 and the cover 29, the same having openings preferably of non-circular configuration to receive the correspondingly configurated ends of the shaft 49.

The drum-driving gear 43 comprises a web 53 preferably extending in a plane intersecting the axis of the pin 49 at right angles, the peripheral edge of the web 53 being formed with a rim carrying gear teeth 55.

The winding drum comprises spaced web portions 57 preferably formed helically with respect to the axis of the bearing 47 to define a helical winding space between the webs adapted to receive the tensioning element 17, one end of which is attached to an anchor-pin 59 extending between the webs 57 which are formed, as at 61, to provide support lugs for the anchor-pin. Where a chain is used, as the tensioning element, the anchor-pin is assembled to the end link of the chain, as shown in Figure 2 of the drawings, said link lying between the webs 57.

The winding drum also is formed with webs 63 extending between the webs 57 substantially radially with respect to the axis of the shaft 49. These radially extending webs are for the purpose of strengthening the webs 57 and to define pockets for receiving alternate links of the chain, including the end link which is anchored to the pin 59. The remaining links of the chain lie upon the outer edges of the webs 57 which are flattened to provide link-supporting surfaces extending at progressively-decreasing distances measuring vertically from the axis of the shaft 49, throughout the circumference of the winding drum, as clearly shown in Figure 2 of the drawings. The web 53 may be formed with a perforation 65 in alignment with the anchor-pin 59 in order to facilitate the application of the anchor-pin between the webs 57 of the winding drum.

The drum-driving gear is drivingly associated with a gear-driving pinion 67 which is mounted in the upper portions of the housing 14. The pinion preferably is formed as an integral part of a rotatable spindle 69 which is journalled for rotation in the back plate 25 and the cover 27, and carries a ratchet 71 preferably formed on the stem 69 in integral fashion. The pinion 67 is thus mounted in the housing in position to drivingly engage with the toothed periphery of the drum-driving gear 43, the ratchet 71 being arranged on the spindle 69 substantially opposite the winding drum 41.

The spindle 69 preferably has an integral, tapered end projecting through and outwardly of the front cover 29 of the housing, said projecting portion being preferably squared to receive a correspondingly squared hub of the hand wheel 15 which is held in place on the spindle in any suitable or convenient means.

By turning the hand wheel 15, of course, the winding drum 41 may be rotated to draw the chain thereon by the driving engagement of the gear 43 and pinion 67. In order, however, to retain the mechanism in tensioned condition, I provide control mechanism 73 preferably mounted on and supported by the opposed back wall 25 and the cover 29 of the housing. This mechanism 73 comprises a pawl 75 tiltably mounted on a pin 77 which in turn is carried on a pawl carrier 79.

The pawl 75 comprises a hub receiving the pin 77 and a projecting ratchet-engaging nose 81 extending from the hub laterally in position to engage the ratchet 71. The pawl 75 is also formed with a preferably integral actuating finger 83 on the side of the hub opposite from the nose 81, and a dependent projection 85 in position to engage a shoulder-forming portion 87 on the carrier 79. The carrier comprises preferably a pair of spaced webs 89 preferably integrally formed on a spindle 91 by means of which the pawl carrier is rockingly mounted on the back wall 25 and cover 29 of the housing.

The shoulder means 87 preferably comprises an integral web extending between and interconnected with the webs 89, and said webs 89 provide spaced journal openings 93 for receiving and supporting the pawl carrying pin 77. The webs 89 are formed with cam-engaging surfaces 95 in position to engage cams 97 comprising outstanding flanges formed preferably integrally on a shaft 99, which shaft is turnably mounted in and supported by the back wall 25 and cover 29 of the housing 14.

Between the lower portions of the cam flanges 97 and formed preferably integrally therewith and with the shaft 99 is a lip-like pawl actuating projection 101 in position to cooperatively engage the pawl-actuating lug 83 and urge the pawl on its carrier toward ratchet-engaging position when the shaft 99 is turned or urged in a counterclockwise direction, viewing Figure 2 of the drawings. The shaft 99, on the side thereof opposite from the cams 97 and pawl-actuating lip 101, is provided with a preferably integral counterweight 103 urging the element normally to turn about the axis of the shaft 99 in a direction to engage the lip 101 with the lug 83, to thereby move the nose 81 of the pawl into engagement with the ratchet 71.

The shaft 99 has an end 105 projecting outwardly of the housing cover 29, said end having a portion 107 formed to receive a collar 109 having a radially-projecting finger 111, the shaft portion 107 being preferably squared or otherwise formed to drivingly connect with the collar 109. The shaft 99, outwardly of the collar-carrying portion 107, is formed with a portion 113 adapted to rotatably receive a control handle 115 which may be held in place on the shaft 99 in any suitable fashion, as by means of the holding nut 117 applied on the threaded end portion 118 of the shaft 99.

The control handle 115 preferably comprises a bar having a hub 119 at one end for receiving the shaft portion 113, the opposite end of the bar being substantially weighted.

The hub 119 is formed with abutments 121 and 123 in spaced angular relationship in position to engage the opposite sides of the projection 111 on the collar 109, in order to urge the same and the shaft 99, on which the collar is fixed, in one direction or the other, according to the position of the weighted handle 115 on one side or the other of the axis of the shaft 99.

The angularity of the abutments 121 and 123 provide for lost motion between the control handle 115 and the shaft 99, whereby the cams 97 and the lip 101 may remain in pawl-actuating position as the handle is moved from a pawl-actuating position, through a substantial displacement, toward pawl-releasing position.

Referring more particularly to Figures 5–8, it will be noted that, when the parts are all in the pawl-actuating position shown in Figure 5, the handle 115 is in gravity-actuated position with the abutment 121 engaging the projection 111, whereby to urge and retain the cams 97 in abutting relationship with the cam following surfaces 95 of the pawl carrier. The pawl carrier thus is positively held in the pawl-actuating position. At the same time, the lip 101, under the influence of the weight 103 as well as the weight of the handle 115, is held against the lug 83 of the pawl, to thereby urge the pawl on its pin 77 in a direction yieldingly engaging the ratchet 71.

When the parts are in the position shown in Figure 5, therefore, the pawl engages the ratchet and prevents rotation thereof in the counterclockwise direction, viewing Figures 2 and 5–8, that is to say, the pawl prevents unwinding movement of the winding mechanism and will hold the winding mechanism in tensioned condition. At the same time, as shown in Figure 6, the pawl 75 may rock on its pin 77 in the pawl carrier 79, if the ratchet is rotated in the clockwise direction to additionally tension the winding mechanism. Rocking movement of the pawl, under such circumstances, will merely depress the lip 101 and turn the shaft 99 in a direction to slightly elevate the weighted handle 115, but without turning the shaft 99 sufficiently to disengage the cams 97 from the surfaces 95 or release the pawl carrier from actuating position.

The handle 115, however, while the pawl and its carrier remain in ratchet-holding position, may be rotated to the intermediate, substantially-vertical position shown in Figure 7, in which the abutment 123 of the handle is in engagement with the shaft projection 111. When in such intermediate position, the weighted handle 115 is on the side of a vertical plane through the shaft 99 opposite from the position occupied by the handle in the pawl-holding position shown in Figures 5 and 6; but the cams 97 and the lip 101 remain in pawl-actuating and holding position due in part to the effect of the counterweight 103, unless and until the back thrust of the ratchet upon the nose 81 of the pawl is relieved, as when the hand wheel 15 is turned in a direction slightly to increase the tension on the element 17 and to relieve the thrust of the ratchet upon the pawl.

When thrust is thus relieved, the frictional engagement between the cams 97 and the follower surfaces 95 is reduced, so that the weight of the handle 115 becomes effective to cause rotation thereof and of the shaft 99 to the position shown in Figure 8, wherein the cams 97 have been withdrawn from carrier-holding position, and the lip 101 has been withdrawn from the lug 83. The carrier 79 thus is free to rotate in counterclockwise direction about the axis of the stem 91 to a position freeing the pawl from the ratchet and permitting the ratchet to turn in a direction allowing the drum to unwind the element 17, the cooperating stops 85 and 87 on the pawl and carrier being designed to prevent the nose of the pawl from dropping to an inoperative position on the carrier when the parts are in ratchet-releasing condition.

It will be seen from the foregoing that I have provided a simple and inexpensive construction comprising a plurality of integral and rugged parts which at the same time allow the facilities and advantages of pawl control hereinbefore described, including the ability of holding the pawl yieldingly in actuating position, allowing the ratchet to turn in one direction but preventing turning movement in the other, and at the same time allowing the mechanism to be conditioned, as indicated in Figure 7, so that the winding mechanism will be held in tensioned condition and released therefrom merely by applying a slight additional tensioning movement on the hand wheel 15, whereupon the ratchet mechanism is automatically tripped by the weight of the handle 115 and without requiring manipulation thereof by the operator.

It is thought that the invention and its numerous attendant advantages will be fully understood from the foregoing description, and it is obvious that numerous changes may be made in the form, construction and arrangement of the several parts without departing from the spirit or scope of the invention or sacrificing any of its attendant advantages, the form herein shown being merely for the purpose of disclosing the invention.

The invention is hereby claimed as follows:

1. The combination, with a ratchet, of pawl means and pawl control means operable to govern the interaction of the pawl means and ratchet, said pawl means comprising a shiftable pawl carrier and a ratchet detent shiftable on said carrier, and said pawl control means being biased normally to hold the carrier in a predetermined operating position and being movable into position releasing the carrier whereby to permit the detent to be retracted from the ratchet, said control means being also movable into position retaining said carrier in said operating position and to yieldingly urge said detent on said carrier toward operative engagement with said ratchet.

2. The combination, with a ratchet, of pawl means and pawl control means operable to govern the interaction of the pawl means and ratchet, said pawl means comprising a rockable pawl carrier and a ratchet detent tiltable on said carrier, and said pawl control means being biased normally to engage said carrier and retain the same in a predetermined operating position, said control means being movable into position releasing the carrier for rocking movement from said operating position whereby to permit the detent to be retracted from the ratchet, said control means being also movable into position retaining said carrier in said operating position and to yieldingly tilt said detent on said carrier toward operative engagement with said ratchet when the carrier is in operating position.

3. The combination, with a ratchet, of pawl means and pawl control means operable to govern the interaction of the pawl means and ratchet, said pawl means comprising a shiftable pawl carrier and a ratchet detent shiftable on said carrier, and said pawl control means comprising a member movable into position engaging and retaining the carrier in a predetermined operating position and yieldingly urging said detent on said carrier toward operative engagement with said ratchet, said member being disposable in position releasing the carrier for movement away from operating position to thereby retract the detent from the ratchet.

4. The combination, with a ratchet, of pawl means and pawl control means operable to govern the interaction of the pawl means and ratchet, said pawl means comprising a shiftable pawl carrier and a ratchet detent shiftable on said carrier, said pawl control means comprising a turnable member having an abutment in position to hold the carrier in a predetermined operating position when said turnable member is in a predetermined angular position, means on said turnable member in position engaging said detent, and biasing means conditionable normally to yieldingly urge said turnable member in a direction to bias the detent toward ratchet engaging position.

5. The combination, with a ratchet, of pawl means and pawl control means operable to govern the interaction of the pawl means and ratchet, said pawl means comprising a shiftable pawl carrier and a ratchet detent shiftable on said carrier, said pawl control means comprising a turnable member having an abutment in position to hold the carrier in a predetermined operating position when said turnable member is in a predetermined angular position, means on said turnable member in position engaging said detent, and biasing means conditionable normally to yieldingly urge said turnable member in a direction to bias the detent toward ratchet engaging position, said biasing means being conditionable to urge the turnable member in a direction to release said carrier for movement away from operating position to permit retraction of the detent from ratchet engaging position.

6. The combination, with a ratchet, of pawl means and pawl control means operable to govern the interaction of the pawl means and ratchet, said pawl means comprising a shiftable pawl carrier and a ratchet detent shiftable on said carrier, said pawl control means comprising a turnable member having an abutment in position to hold the carrier in a predetermined operating position when said turnable member is in a predetermined angular position, means on said turnable member in position engaging said detent, and biasing means conditionable normally to yieldingly urge said turnable member in a direction to bias the detent toward ratchet engaging position, said biasing means being conditionable to urge the turnable member in a direction to release said carrier for movement away from operating position to permit retraction of the detent from ratchet engaging position, said biasing means comprising a weighted lever, and means drivingly connecting said lever with said turnable member.

7. The combination, with a ratchet, of pawl means and pawl control means operable to govern the interaction of the pawl means and ratchet, said pawl means comprising a shiftable pawl carrier and a ratchet detent shiftable on said carrier, said pawl control means comprising a turnable member having an abutment in position to hold the carrier in a predetermined operating position when said turnable member is in a predetermined angular position, means on said turnable member in position engaging said detent, and biasing means conditionable normally to yieldingly urge said turnable member in a direction to bias the detent toward ratchet engaging position, said biasing means being conditionable to urge the turnable member in a direction to release said carrier for movement away from operating position to permit retraction of the detent from ratchet engaging position, said biasing means comprising a weighted lever, and means comprising a lost motion connection drivingly connecting said lever with said turnable member whereby the turnable member may remain in carrier holding position as said lever is shifted from operating position on one side of the vertical plane through its axis of rotation to an intermediate position on the other side of said plane in position to move the turnable member to carrier releasing position upon withdrawal of the thrust of the ratchet on said detent.

8. In combination, with tensioning mechanism comprising a winding drum, means for turning the same to draw a flexible tension element thereon, and a ratchet drivingly connected with said drum, of holding means operatively associated with said ratchet and comprising pawl means and pawl control means operable to govern the interaction of the pawl means and ratchet, said pawl means comprising a shiftable pawl carrier and a ratchet detent shiftable on said carrier, and said pawl control means being adapted normally to hold the carrier in a predetermined operating position and being selectively operable to release the carrier to permit retraction of the detent from the ratchet, or to retain said carrier in said operating position and to yieldingly urge said detent on said carrier toward operative engagement with said ratchet.

9. In combination, with tensioning mechanism comprising a winding drum, means for turning the same to draw a flexible tension element thereon, and a ratchet drivingly connected with said drum, of holding means operatively associated with said ratchet and comprising pawl means and pawl control means operable to govern the interaction of the pawl means and ratchet, said pawl means comprising a shiftable pawl carrier and a ratchet detent shiftable on said carrier, and said pawl control means comprising a turnable member having an abutment in position to hold the carrier in a predetermined operating position when said turnable member is in a predetermined angular position, means on said turnable member in position engaging said detent, and biasing means conditionable normally to yieldingly urge said turnable member in a direction to bias the detent toward ratchet engaging position, said biasing means being conditionable to urge the turnable member in a direction to release said carrier for movement away from operating position to thereby permit retraction of the detent from ratchet engaging position.

10. Tensioning mechanism for vehicle brake rigging comprising an enclosing housing and winding mechanism within said housing comprising a winding drum, means to turn the same to draw upon said drum a flexible tension element connected with the brake rigging, a ratchet drivingly connected with said drum and turnable in response to the movement thereof, pawl means comprising a shiftable pawl carrier and a ratchet detent shiftable on the carrier and operatively associated with said ratchet, and pawl control means, said pawl control means being adapted normally to hold the carrier in a predetermined operating position and being selectively operable to release the carrier to permit retraction of the detent from the ratchet, or to retain said carrier in said operating position and to yieldingly urge said detent on said carrier toward operative engagement with said ratchet, said pawl control means comprising a turnable member having an abutment in position to hold the carrier in a predetermined operating position when said turnable member is in a predetermined angular position, means on said turnable member in position to engage said detent, and biasing means conditionable normally to yieldingly urge said turnable member in a direction to bias the detent toward ratchet engaging position, said biasing means comprising a weighted lever, and means drivingly connecting said lever with said turnable member, comprising a lost motion connection whereby the member may remain in carrier holding position as said lever is shifted from operating position on one side of the vertical plane through its axis of rotation to an intermediate position on the other side of said plane in position to urge the turnable member toward carrier releasing position to thereby release the carrier upon withdrawal of the thrust of the ratchet on said detent upon turning the drum in a direction to increase tension on said flexible tension element.

HENRY D. BREEN.